(12) United States Patent
Ji et al.

(10) Patent No.: US 10,511,504 B2
(45) Date of Patent: Dec. 17, 2019

(54) CELL-SPECIFIC REFERENCE SIGNAL INTERFERENCE AVERAGING

(71) Applicant: QUALCOMM Incorporated, San Diego, CA (US)

(72) Inventors: Tingfang Ji, San Diego, CA (US); Peter Gaal, San Diego, CA (US); Iyab Issam Sakhnini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 92 days.

(21) Appl. No.: 14/161,312

(22) Filed: Jan. 22, 2014

(65) Prior Publication Data

US 2014/0211646 A1 Jul. 31, 2014

Related U.S. Application Data

(60) Provisional application No. 61/756,901, filed on Jan. 25, 2013.

(51) Int. Cl.
*H04L 12/26* (2006.01)
*H04W 24/10* (2009.01)

(52) U.S. Cl.
CPC .............. *H04L 43/08* (2013.01); *H04L 43/06* (2013.01); *H04W 24/10* (2013.01)

(58) Field of Classification Search
None
See application file for complete search history.

(56) References Cited

U.S. PATENT DOCUMENTS

| 8,923,143 | B2 | 12/2014 | Gorokhov et al. |
| 2010/0195588 | A1* | 8/2010 | Wan et al. ............ 370/329 |
| 2011/0044186 | A1 | 2/2011 | Jung et al. |

(Continued)

FOREIGN PATENT DOCUMENTS

| CN | 102640527 A | 8/2012 |
| JP | 2008271200 A | 11/2008 |

(Continued)

OTHER PUBLICATIONS

Alcatel-Lucent: "Interference Averging for CSI-IM," 3GPP Draft; R4-130136 CSI-IM, 3rd Generation Partnership Project (3GPP), Mobile competence centre; 650, Route Des Lucioles; F-06921 Sophia-Antipolis Cedex; France, vol. RAN WG4, No. Malta; Jan. 28, 2013-Feb. 1, 2013, Jan. 21, 2013, 2 pages, XP050675129, Retrieved from the Internet : < URL: http://www.3gpp.org/ftp/tsg_ran/WG4_Radio/TSGR4_66/Docs/ >, [retrieved on Jan. 21, 2013] the whole document.

(Continued)

*Primary Examiner* — Jeffrey M Rutkowski
*Assistant Examiner* — Ning Li
(74) *Attorney, Agent, or Firm* — Patterson & Sheridan, LLP (57) ABSTRACT

Aspects of the present disclosure provide techniques and apparatus for enhancing performance by selectively applying averaging to CSI reporting processes. According to certain aspects, a base station (e.g., an eNB) with knowledge of traffic patterns of potentially interfering transmitters may signal a UE how (or whether) to apply averaging, for example, when reporting CSI based on interference measurement resources (IMR).

28 Claims, 10 Drawing Sheets

(56) References Cited

U.S. PATENT DOCUMENTS

| | | | |
|---|---|---|---|
| 2011/0217985 A1* | 9/2011 | Gorokhov | H04W 24/10 455/452.2 |
| 2011/0281585 A1* | 11/2011 | Kwon | H04L 1/0002 455/436 |
| 2011/0305295 A1* | 12/2011 | Kim | H04L 5/0044 375/295 |
| 2012/0082052 A1* | 4/2012 | Oteri et al. | 370/252 |
| 2012/0165029 A1* | 6/2012 | Lindbom | H04L 5/00 455/450 |
| 2012/0207044 A1* | 8/2012 | Johansson | H04W 24/10 370/252 |
| 2012/0213261 A1* | 8/2012 | Sayana | H04L 5/0048 375/224 |
| 2012/0275322 A1 | 11/2012 | Ji et al. | |
| 2012/0281563 A1* | 11/2012 | Comsa | H04W 24/10 370/252 |
| 2013/0064216 A1* | 3/2013 | Gao et al. | 370/330 |
| 2013/0084910 A1* | 4/2013 | Suzuki | H04W 24/02 455/515 |
| 2013/0208604 A1* | 8/2013 | Lee | H04L 25/0226 370/252 |
| 2013/0225188 A1* | 8/2013 | Seo | H04J 11/005 455/450 |
| 2013/0286867 A1* | 10/2013 | Davydov | H04W 24/06 370/252 |
| 2013/0336214 A1* | 12/2013 | Sayana | H04B 7/024 370/328 |
| 2013/0344909 A1* | 12/2013 | Davydov et al. | 455/501 |
| 2014/0016497 A1* | 1/2014 | Seo | H04L 5/0023 370/252 |
| 2014/0022988 A1* | 1/2014 | Davydov et al. | 370/328 |
| 2014/0044061 A1* | 2/2014 | Yue | H04W 72/042 370/329 |
| 2014/0112248 A1* | 4/2014 | Bergman et al. | 370/328 |
| 2014/0301231 A1* | 10/2014 | Hooli et al. | 370/252 |
| 2015/0049689 A1* | 2/2015 | Seo | H04L 5/005 370/329 |
| 2015/0156751 A1* | 6/2015 | Seo | H04B 17/00 370/329 |
| 2015/0172951 A1* | 6/2015 | Chen | H04W 24/10 370/252 |
| 2015/0208296 A1* | 7/2015 | Song | H04W 48/16 370/331 |
| 2015/0264594 A1* | 9/2015 | Davydov | H04W 72/12 370/252 |
| 2017/0149514 A1* | 5/2017 | Comsa | H04W 24/10 |
| 2018/0376359 A9* | 12/2018 | Kim | H04W 24/08 |

FOREIGN PATENT DOCUMENTS

| | | |
|---|---|---|
| JP | 2011015318 A | 1/2011 |
| JP | 2012178861 A | 9/2012 |
| WO | WO-2011008519 A1 | 1/2011 |
| WO | WO 2012/070823 A2 * | 5/2012 ............... H04B 7/26 |
| WO | WO 2014/058372 A1 * | 1/2013 ............... H04B 7/02 |

OTHER PUBLICATIONS

International Search Report and Written Opinion—PCT/US2014/012655—ISA/EPO—dated Jun. 12, 2014.

NTT DOCOMO: "Discussion for CoMP interference calculation methodologies," 3GPP Draft; R4-130505, 3rd Generation partnership project (3GPP), Mobile competence centre; 650, Route Des Lucioles; F-06921 Sophia-Antipolis Cedex; France, vol. RAN WG4, No. St. Julian; Jan. 28, 2013-Feb. 1, 2013, Jan. 22, 2013 (Jan. 22, 2013), 3 pages, XP050675198, Retrieved from the Internet < URL: http://www.3gpp.org/ftp/tsg_ran/WG4_Radio/TSGR4_66/Docs/ >, [retrieved on Jan. 22, 2013] the whole document.

Renesas Mobile Europe Ltd: "On CQI Definition," 3GPP Draft; R1-125051, 3rd Generation partnership project (3GPP), Mobile competence centre; 650, Route Des Lucioles; F-06921 Sophia-Antipolis Cedex; France, vol. RAN WG1, No. New Orleans, USA; Nov. 12, 2012-Nov. 16, 2012, Nov. 2, 2012, 4 pages, XP050662709, Retrieved from the Internet < URL: http://www.3gpp.org/ftp/tsg_ran/WG1_RL1/TSGR1_71/Docs/ >, [retrieved on Nov. 2, 2012] the whole document.

Ericsson, et al., "Comp Interference Averaging", 3GPP TSG RAN WG4 Meeting #66 R4-130528, Jan. 21, 2013, pp. 1-4, [retrieved on Feb. 28, 2018], Retrieved from the Internet: URL:http://www.3gpp.org/ftp/tsg_ran/WG4_Radio/TSGR4_66/Docs/R4-130528.zip.

Ericsson, et al., "On Interference Measurements Based on CSI-IM", 3GPP TSG-RAN WG1 #71 R1-125200, Nov. 3, 2012, pp. 1-3, [retrieved on Feb. 28, 2018], Retrieved from the Internet: URL:http://www.3gpp.org/ftp/tsg_ran/WG1_RL1/TSGR1_71/Docs/R1-125200.zip.

Huawei, et al., "Discussion on Interference Averaging for CSI-IM", 3GPP TSG-RAN WG4#66 R4-130425, Jan. 21, 2013, pp. 1-5, [retrieved on Feb. 28, 2018], Retrieved from the Internet: URL: http://www.3gpp.org/ftp/tsg_ran/WG4_Radio/TSGR4_66/Docs/R4-130425.zip.

Intel Corporation: "Discussion on Interference Averaging in the Time Domain", 3GPP TSG-RAN WG4 #66 R4-130238, Jan. 21, 2013, pp. 1-4, [retrieved on Feb. 28, 2018], Retrieved from the Internet: URL: http://www.3gpp.org/ftp/tsg_ran/WG4_Radio/TSGR4_66/Docs/R4-130238.zip.

ZTE: "Remaining Issues on configuration of CSI Process and IMR", 3GPP TSG RAN WG1 Meeting #70bis R1-124196, Sep. 29, 2012, pp. 1-7, [retrieved on Feb. 28, 2018], Retrieved from the Internet: URL: http://www.3gpp.org/ftp/tsg_ran/WG1_RL1/TSGR1_70b/Docs/R1-124196.zip.

ZTE: "Mechanisms for Interference Avoidance and Coordination in Small Cell Scenarios", 3GPP TSG RAN WG1 Meeting #72 R1-130135, Jan. 19, 2013, pp. 1-7, [retrieved on Feb. 28, 2018], Retrieved from the Internet: URL: http://www.3gpp.org/ftp/tsg_ran/WG1_RL1/TSGR1_72/Docs/R1-130135.zip.

* cited by examiner

CELL-SPECIFIC REFERENCE SIGNAL INTERFERENCE AVERAGING

CLAIM OF PRIORTY UNDER 35 U.S.C. § 119

This application claims benefit of U.S. Provisional Patent Application Ser. No. 61/756,901, filed Jan. 25, 2013, which is herein incorporated by reference in its entirety.

BACKGROUND

I. Field

Certain aspects of the present disclosure generally relate to wireless communications and, more particularly, to cell-specific reference signal (CRS) interference averaging.

II. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE) including LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

SUMMARY

Certain aspects of the present disclosure generally relate to wireless communications and, more particularly, to cell-specific reference signal (CRS) interference averaging.

Certain aspects of the present disclosure provide a method for wireless communications by a user equipment (UE). The method generally includes receiving, from a base station, an indication of a type of averaging to be applied for channel state information (CSI) reporting, measuring reference signals received in one or more subframes, generating a CSI report based on the measurements and the indicated type of averaging, and sending the CSI report.

Certain aspects of the present disclosure provide a method for wireless communications by a base station (BS). The method generally includes transmitting, to a user equipment (UE), an indication of a type of averaging to be applied for channel state information (CSI) reporting and receiving, from the UE, a CSI report generated based on reference signal measurements and the indicated type of averaging.

Certain aspects of the present disclosure provide an apparatus for wireless communications by a user equipment (UE). The apparatus generally includes means for receiving, from a base station, an indication of a type of averaging to be applied for channel state information (CSI) reporting, means for measuring reference signals received in one or more subframes, means for generating a CSI report based on the measurements and the indicated type of averaging, and means for sending the CSI report.

Certain aspects of the present disclosure provide an apparatus for wireless communications by a base station (BS). The apparatus generally includes means for transmitting, to a user equipment (UE), an indication of a type of averaging to be applied for channel state information (CSI) reporting and means for receiving, from the UE, a CSI report generated based on reference signal measurements and the indicated type of averaging.

Certain aspects of the present disclosure also provide apparatuses and program products for performing the operations described above.

Various aspects and features of the disclosure are described in further detail below.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Aspects of the present disclosure provide techniques and apparatus for enhancing performance by selectively applying averaging to CSI reporting processes. According to certain aspects, a base station (e.g., an eNB) with knowledge of traffic patterns of potentially interfering transmitters may signal a UE how (or whether) to apply averaging, for example, when reporting CSI based on interference measurement resources (IMR). As a result, the report may provide a more useful measurement of actual interference.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2).

Single carrier frequency division multiple access (SC-FDMA) is a transmission technique that utilizes single carrier modulation at a transmitter side and frequency domain equalization at a receiver side. The SC-FDMA has similar performance and essentially the same overall complexity as those of OFDMA system. However, SC-FDMA signal has lower peak-to-average power ratio (PAPR) because of its inherent single carrier structure. The SC-FDMA has drawn great attention, especially in the uplink communications where lower PAPR greatly benefits the mobile terminal in terms of transmit power efficiency. It is currently a working assumption for uplink multiple access scheme in the 3GPP LTE and the Evolved UTRA.

A base station ("BS") may comprise, be implemented as, or known as NodeB, Radio Network Controller ("RNC"), Evolved NodeB (eNodeB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

A user equipment (UE) may comprise, be implemented as, or known as an access terminal, a subscriber station, a subscriber unit, a remote station, a remote terminal, a mobile station, a user agent, a user device, user equipment, a user station, or some other terminology. In some implementations, mobile station may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

The techniques described herein ma y be used for the wireless networks and radio technologies mentioned above as well as other wireless networks and radio technologies. For clarity, certain aspects of the techniques are described below for LTE, and LTE terminology is used in much of the description below.

An Example Wireless Communication Systems

Figure 1:
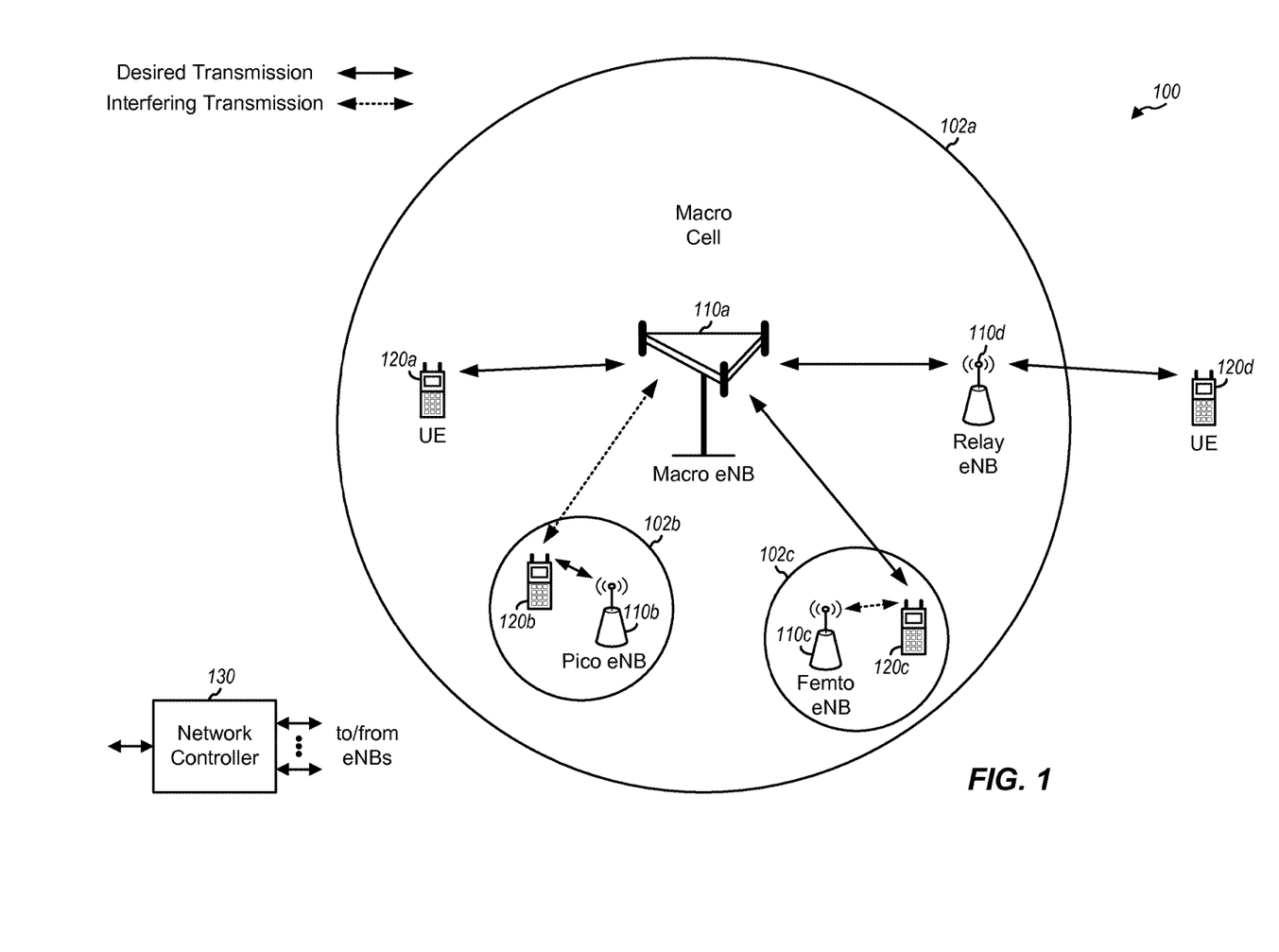
FIG. 1 is a block diagram conceptually illustrating an example wireless communication network, in accordance with certain aspects of the present disclosure.

FIG. 1 shows a wireless communication network 100, which may be an LTE network or some other wireless network. Wireless network 100 may include a number of evolved Node Bs (eNBs) 110 and other network entities. An eNB is an entity that communicates with user equipments (UEs) and may also be referred to as a base station, a Node B, an access point (AP), etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription.

A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station," and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 W) whereas pico eNBs, femto eNBs, and relay eNBs may have lower transmit power levels (e.g., 0.1 to 2 W).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station (MS), a subscriber unit, a station (STA), etc. A UE may be a cellular phone, a personal digital assistant (PDA), a wireless modem, a wireless communication device, a handheld device, a laptop computer, a cordless phone, a wireless local loop (WLL) station, a tablet, a smart phone, a netbook, a smartbook, etc.

Figure 2:
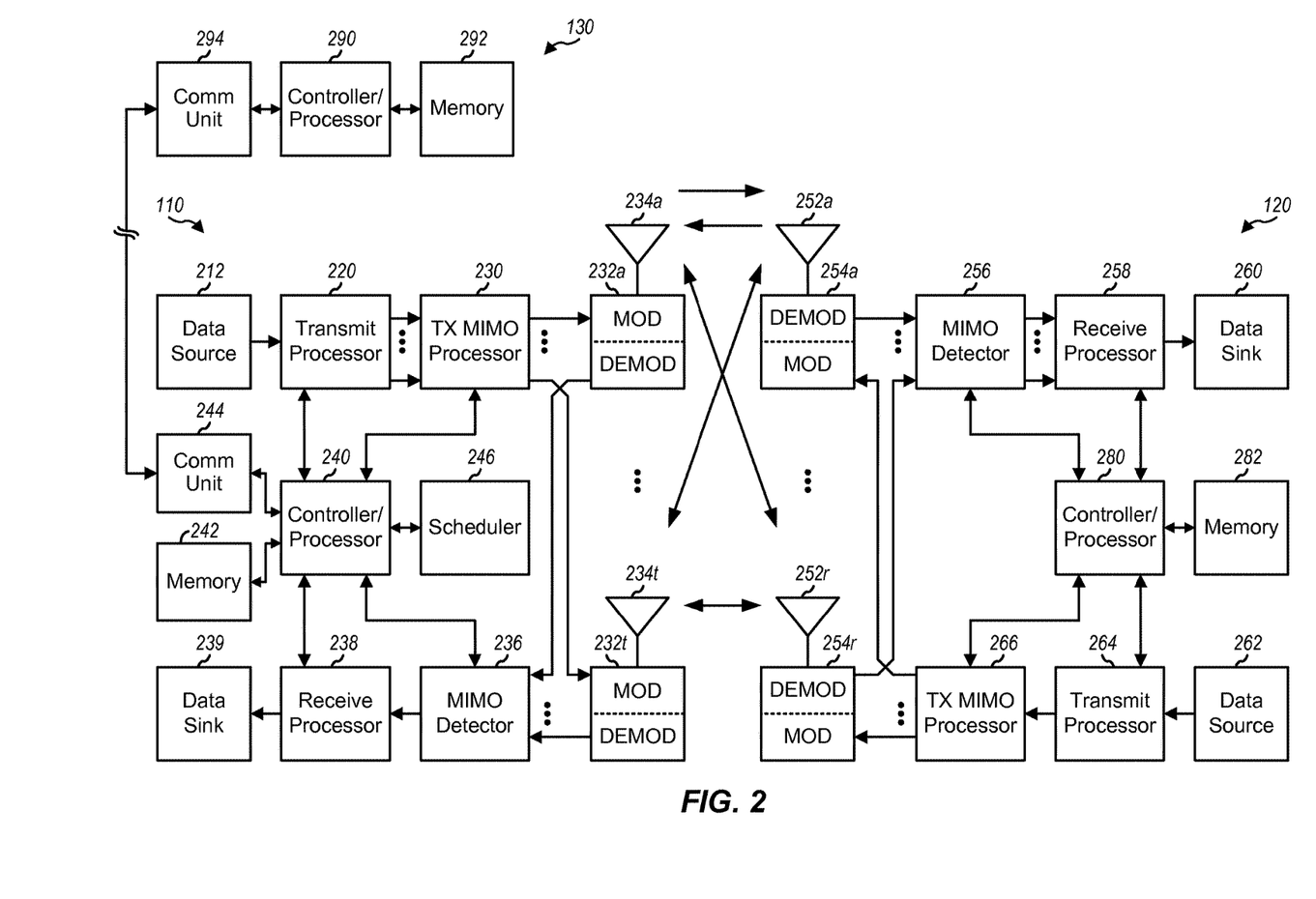
FIG. 2 is a block diagram conceptually illustrating an example of an evolved node B (eNB) in communication with a user equipment (UE) in a wireless communications network, in accordance with certain aspects of the present disclosure.

FIG. 2 is a block diagram of a design of base station/eNB 110 and UE 120, which may be one of the base stations/eNBs and one of the UEs in FIG. 1. Base station 110 may be equipped with T antennas 234a through 234t, and UE 120 may be equipped with R antennas 252a through 252r, where in general $T \geq 1$ and $R \geq 1$.

At base station 110, a transmit processor 220 may receive data from a data source 212 for one or more UEs, select one or more modulation and coding schemes (MCSs) for each UE based on channel quality indicators (CQIs) received from the UE, process (e.g., encode and modulate) the data for each UE based on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Processor 220 may also generate reference symbols for reference signals (e.g., the common reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 may direct the operation at base station 110 and UE 120, respectively. Processor 240 and/or other processors and modules at base station 110, and/or processor 280 and/or other processors and modules at UE 120, may perform or direct processes for the techniques described herein. Memories 242 and 282 may store data and program codes for base station 110 and UE 120, respectively. A scheduler 246 may schedule UEs for data transmission on the downlink and/or uplink.

When transmitting data to the UE 120, the base station 110 may be configured to determine a bundling size based at least in part on a data allocation size and precode data in bundled contiguous resource blocks of the determined bundling size, wherein resource blocks in each bundle may be precoded with a common precoding matrix. That is, reference signals (RSs) such as UE-RS and/or data in the resource blocks may be precoded using the same precoder. The power level used for the UE-RS in each resource block (RB) of the bundled RBs may also be the same.

The UE 120 may be configured to perform complementary processing to decode data transmitted from the base station 110. For example, the UE 120 may be configured to determine a bundling size based on a data allocation size of received data transmitted from a base station in bundles of contiguous RBs, wherein at least one reference signal in resource blocks in each bundle are precoded with a common precoding matrix, estimate at least one precoded channel based on the determined bundling size and one or more RSs transmitted from the base station, and decode the received bundles using the estimated precoded channel.

Figure 3:
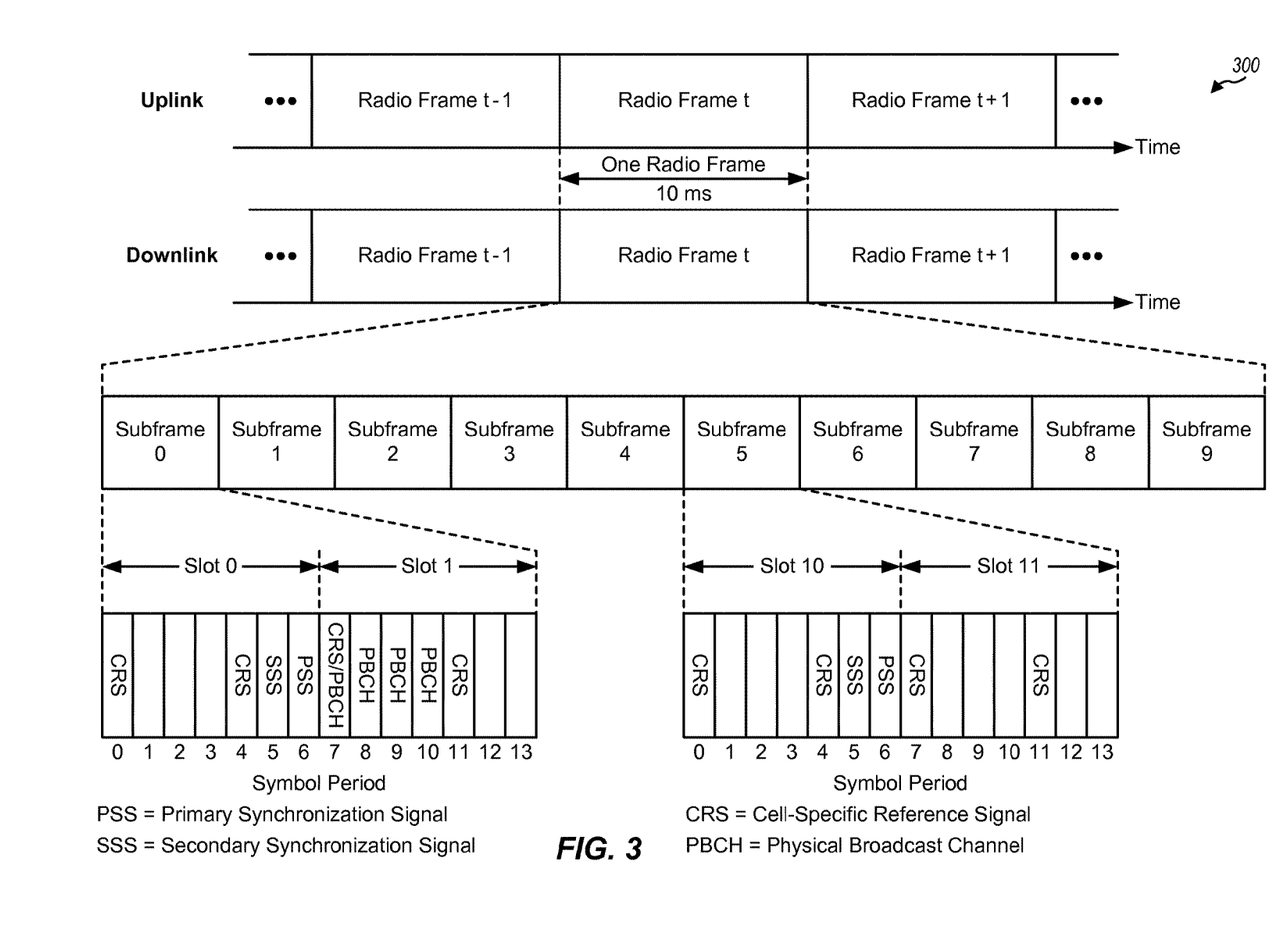
FIG. 3 is a block diagram conceptually illustrating an example frame structure for a particular radio access technology (RAT) for use in a wireless communications network, in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

The PSS, SSS, CRS, and PBCH in LTE are described in 3GPP TS 36.211, entitled "Evolved Universal Terrestrial Radio Access (E-UTRA); Physical Channels and Modulation," which is publicly available.

Figure 4:
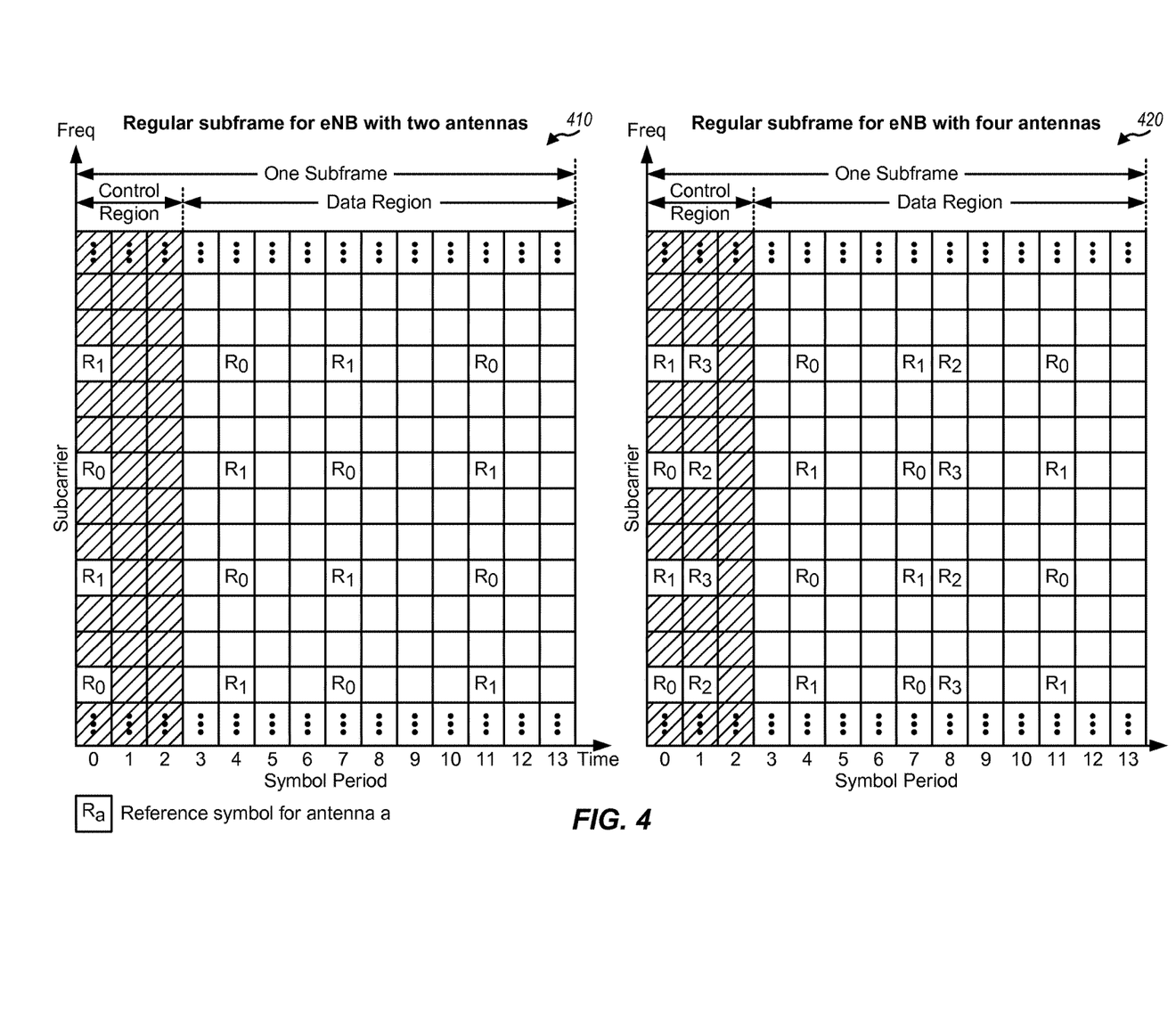
FIG. 4 illustrates an example subframe format for the downlink with normal cyclic prefix (CP), in accordance with certain aspects of the present disclosure.
Figure 5:
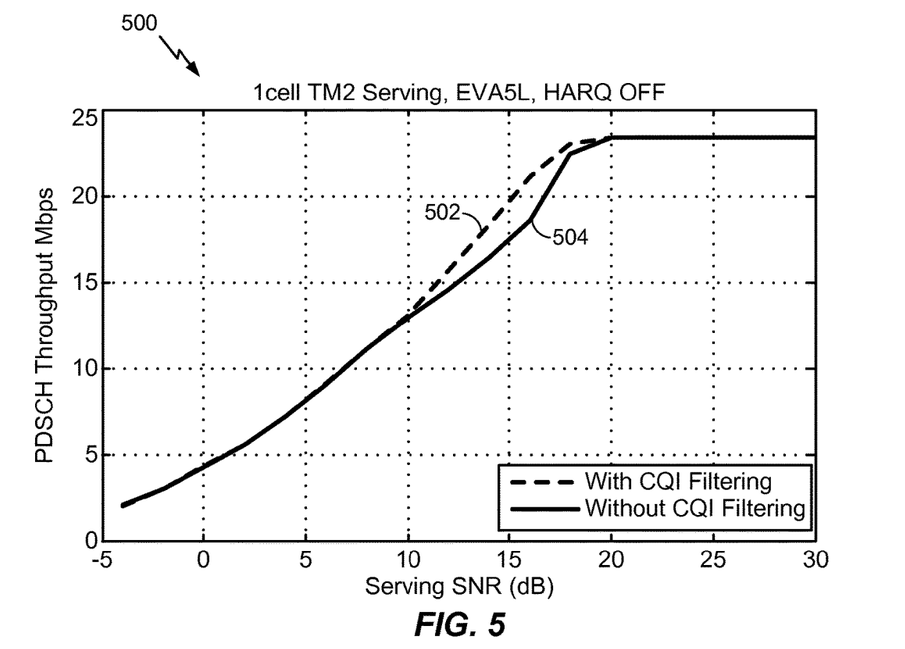
FIGS. 5-8 illustrate an example gains achieved with channel state information (CSI) filtering, in accordance with certain aspects of the present disclosure.
Figure 6:
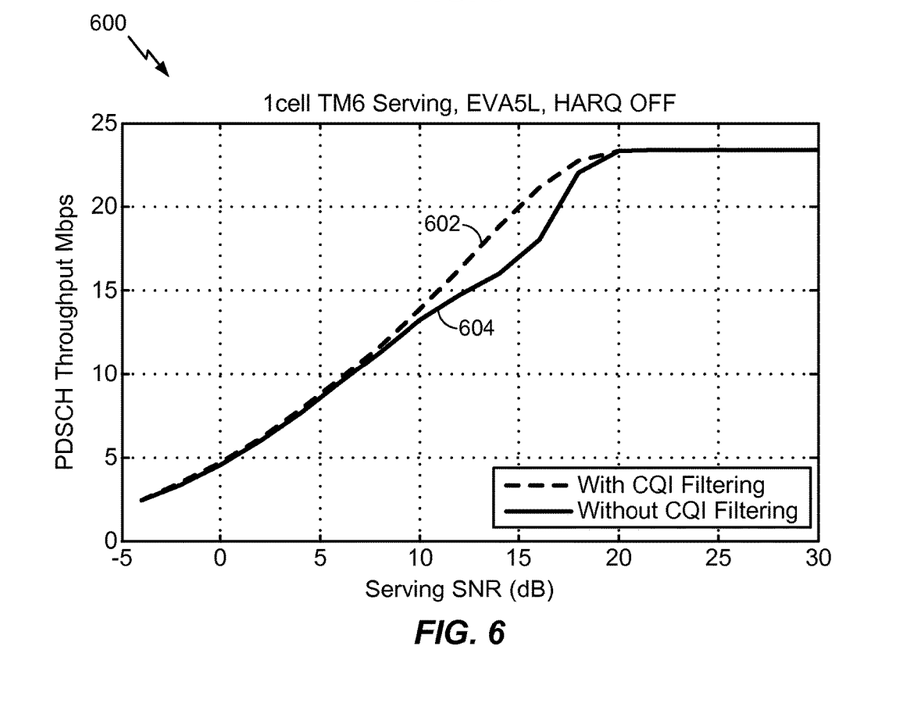
Figure 7:
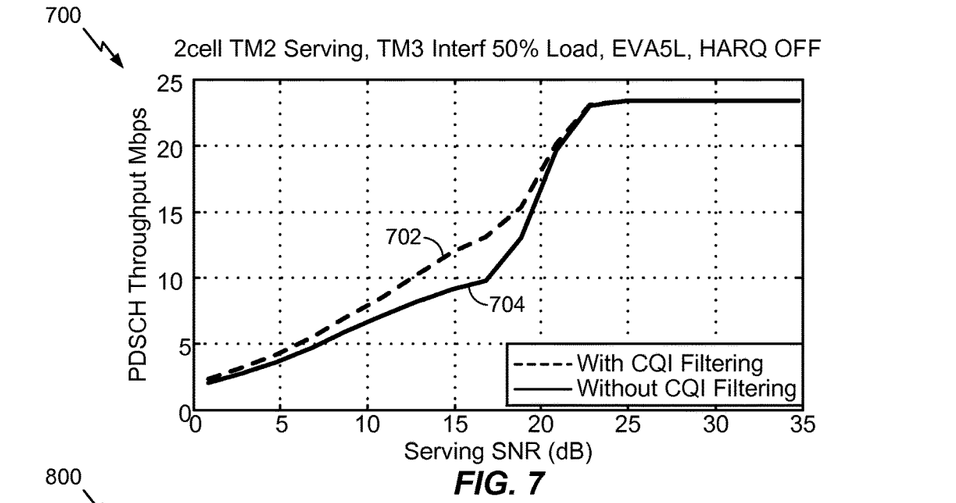
Figure 8:
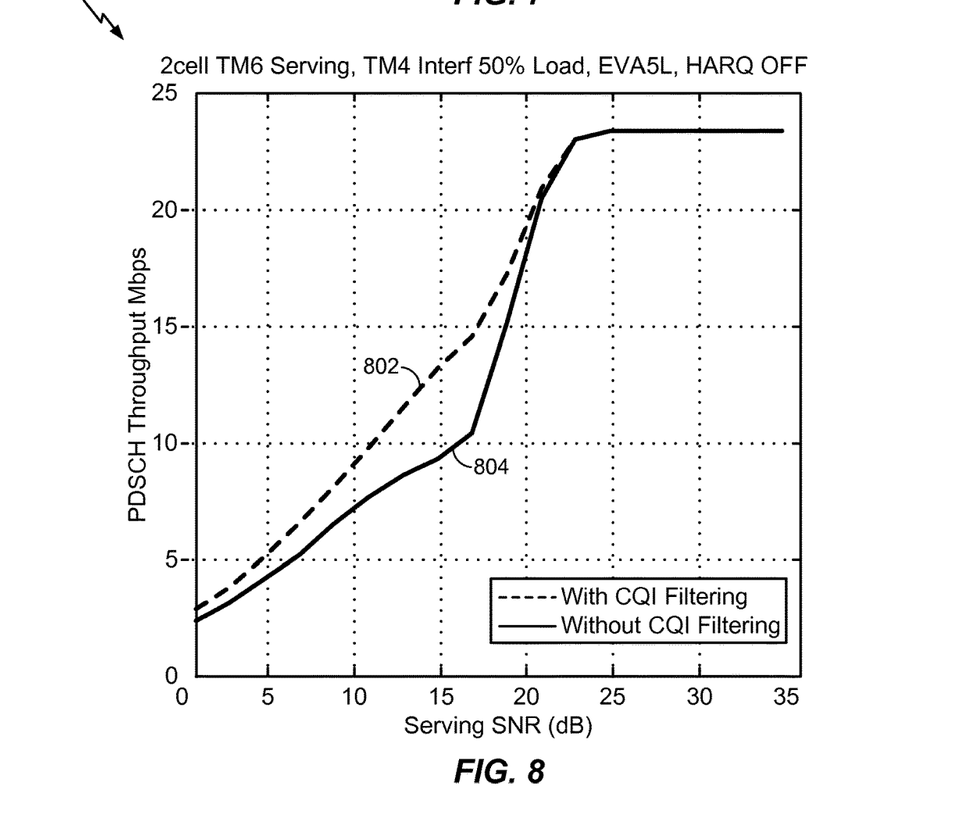

FIG. 4 shows two example subframe formats 410 and 420 for the downlink with a normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for an eNB equipped with two antennas. A CRS may be transmitted from antennas 0 and 1 in symbol periods 0, 4, 7, and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used for an eNB equipped with four antennas. A CRS may be transmitted from antennas 0 and 1 in symbol periods 0, 4, 7, and 11 and from antennas 2 and 3 in symbol periods 1 and 8. For both subframe formats 410 and 420, a CRS may be transmitted on evenly spaced subcarriers, which may be determined based on cell ID. Different eNBs may transmit their CRSs on the same or different subcarriers, depending on their cell IDs. For both subframe formats 410 and 420, resource elements not used for the CRS may be used to transmit data (e.g., traffic data, control data, and/or other data).

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q $\in \{0, \ldots, Q-1\}$.

The wireless network may support hybrid automatic retransmission request (HARQ) for data transmission on the downlink and uplink. For HARQ, a transmitter (e.g., an eNB 110) may send one or more transmissions of a packet until the packet is decoded correctly by a receiver (e.g., a UE 120) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, path loss, etc. Received signal quality may be quantified by a signal-to-interference-plus-noise ratio (SINR), or a reference signal received quality (RSRQ), or some other metric. The UE may operate in a dominant interference scenario in which the UE may observe high interference from one or more interfering eNBs.

Example Cell-Specific Reference Signal
Interference Averaging

In certain systems (e.g., long term evolution (LTE) Release 11), channel state information-interference measurement (CSI-IM) resources can assist the user equipment (UE) for better interference estimation and measurements. The measurement interval for CSI-IM resources may be a UE implementation.

When the interference is measured based on resources occupied by the interferer's data transmission, the measurement can show wide variation according to the interferer's traffic load. In this case, the measured interference may not be well correlated with the interference in a particular scheduled subframe. To reduce the discrepancy caused by the interference variations, it is beneficial for the UE to average the measured interference.

However, in a system where the scheduler is aware of the interferer's traffic pattern, the measured interference can be well correlated with scheduled subframes by associating measurement subframes with scheduling subframes that are experiencing the same type of interfering traffic. In this case, it is not beneficial to average measured interference by the UE.

Since the UE cannot determine itself whether the scheduler (eNB) is aware of the interferer's traffic, the UE is not able to determine the best averaging strategy without assistance from the eNB.

Therefore, according to certain aspects of the present disclosure, a base station (eNB) may provide a UE with an indication of a type of averaging (and/or whether to average). In some embodiments, the eNB may send signaling to indicate what type of averaging should be followed by the UE for the CSI report. The averaging may refer to one or more of the following: interference averaging, channel averaging, signal-to-noise ratio (SNR) averaging, and spectral efficiency averaging.

The averaging type can indicate either or both of time-domain averaging and frequency-domain averaging. The signaling may be either dedicated or broadcast, with dedicated signaling possibly being more efficient and flexible.

An efficient signaling can be a single bit indication, indicating one of two different averaging modes. For example, a single bit may indicate the UE should use a limited, fixed averaging (e.g., one subframe or one physical resource block (PRB)) or a less restricted (or unrestricted) averaging.

According to certain aspects, for CSI-IM, interference may be measured on specific resources signaled to the UE. When the CSI report indicates that periodicity and timing can be aligned with the CSI-IM resources of interest, no further signaling beyond the averaging indication may be used. However, this may introduce undue restriction, for example, the UE report may be restricted to specific subframes only.

According to certain aspects, the eNB may send additional signaling to associate a reporting process with a certain set of measurement resources, thereby decoupling the time of measurement from the time of sending the report.

According to certain aspects, a periodic CSI measurement process may be associated with a measurement subframe subset by radio resource control (RRC) signaling. In aspects, the averaging indicator may further control whether the UE should average within the subframe subset or not.

For CRS-based modes, FIGS. 5-8 illustrates example gains which may be achieved with CSI filtering for UE link level simulations, in accordance with certain aspects of the present disclosure. FIGS. 5-8 show physical downlink shared channel (PDSCH) throughput versus SNR for 1 cell TM2 serving 500, 1 cell TM6 serving 600, 2 cell TM2 serving 700, and 2 cell TM6 serving 800, respectively. One curve each graph shows gains with CSI filtering 502, 602, 702, 802 and the other curve shows gains without CSI filtering 504, 604, 704, 804. FIGS. 5-8 show example link level simulation results for additive white Gaussian noise (AWGN) and explicit interferer with 50% loading. It can be seen that interferer filtering (in time domain) increases the performance drastically. Frequency domain filtering is fixed for all scenarios.

In the case of AWGN interferer, filtering may account for channel variations and help reduce the SNR (CQI) variance. This may help in preventing overshooting the CQI with higher block error rate (BLER) and lower overall performance. In the case of an explicit interferer, filtering may reduce the variance of SNR (CQI) and prevents CQI overshooting. In the 50% loading case, it may reduce channel and interference variations.

Figure 9:
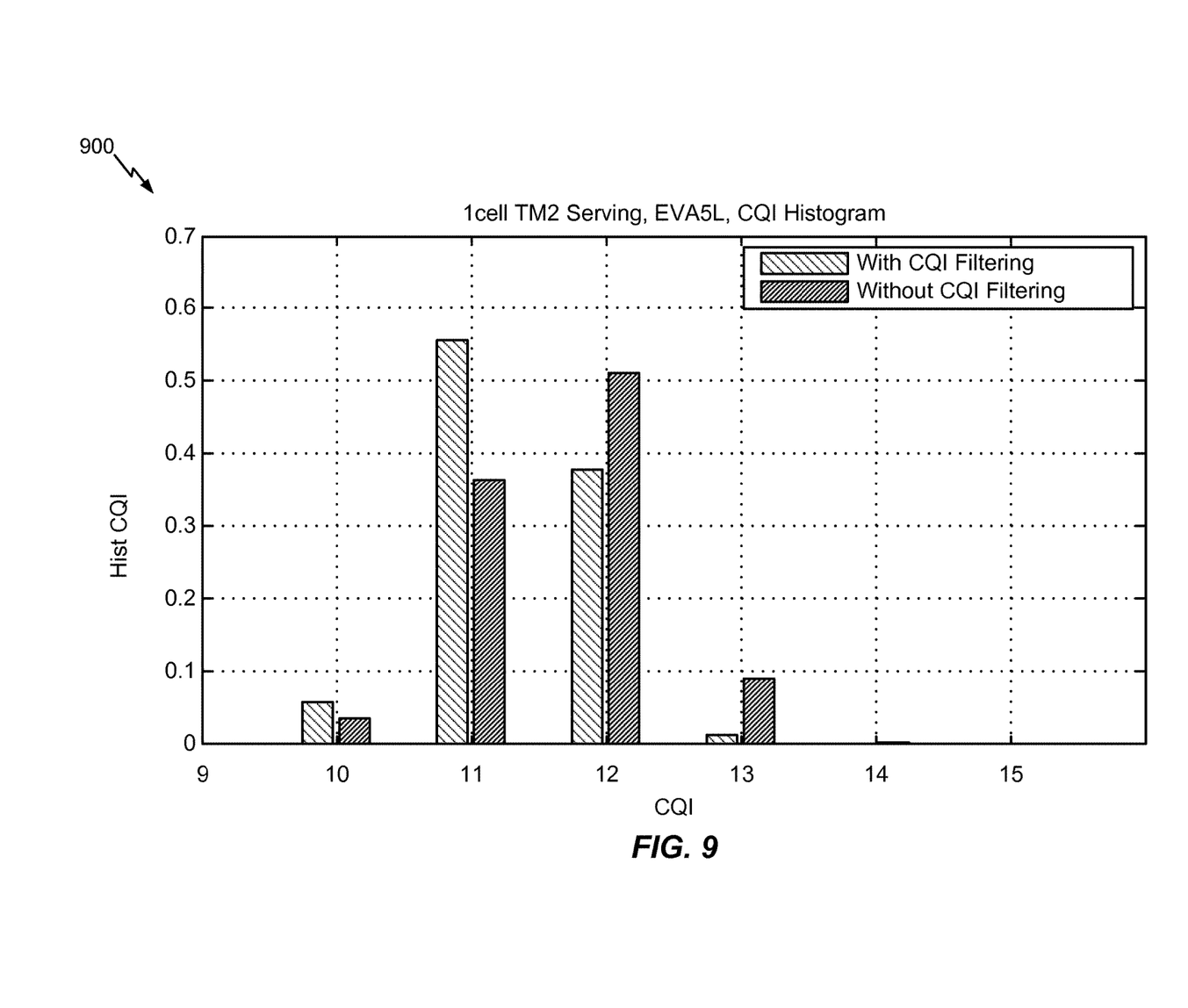
FIGS. 9-10 illustrate example CQI histograms, in accordance with certain aspects of the present disclosure.
Figure 10:
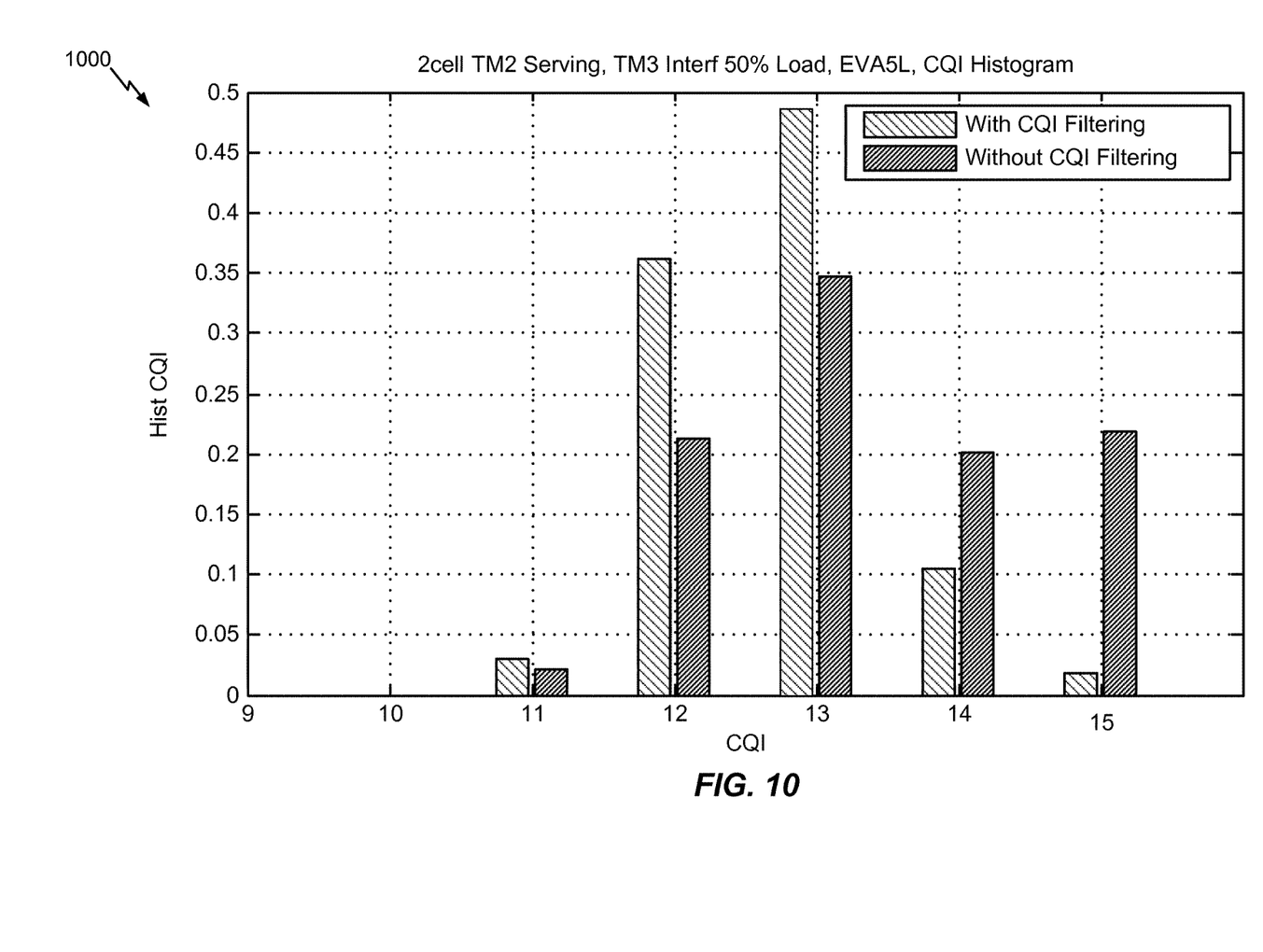

FIGS. 9 and 10 illustrate example CQI histograms for one cell TM2 serving 900 and two cell TM2 serving 1000, in accordance with certain aspects of the present disclosure. FIGS. 9 and 10 each include a bar showing gains with CQI filtering and one bar showing gains without CQI filtering. It can be seen that the high CQI values (which can result in high BLER and impact performance) are reduced.

In aspects, using RS-based modes, CSI filtering may reduce the channel and interferer variations and help reduce the SNR (CQI) variance resulting in fewer instances where the CQI can overshoot increasing the BLER and reducing performance. In aspects, using CSI-RS and CSI-IM modes, UE may be configured to report multiple CSI reports measuring different interference structures. Filtering CSI in these cases relies heavily on the level of transmission point coordination.

According to certain aspects, where tight transmission point (TP) coordination is implemented across a large geographical area, UE CSI filtering may not be used. The interference may be controlled by the network and the UE can rely on this coordination. It may be desirable for the network to know exactly what interference the UE is seeing per CSI report without any significant time or frequency filtering to better decide on TP scheduling. Filtering in these cases may not give the network a true picture of the interference as the CQI can become noisy and not reflective of the latest measurement. In aspects, UE CSI filtering may not be used for CSI-RS and CSI-IM based modes where tight TP coordination and minimal uncontrolled interference exists.

According to certain aspects, where tight TP coordination is not implemented or coordinated multipoint (CoMP) cluster size is moderate, UE CSI filtering can help with the performance. In CoMP scenarios 1, 2, 3, and 4, the cluster size may be limited to 1, 3, or 9 macro cells; hence, residual interference outside the CoMP cluster could be significant for many UEs. These UEs can benefit from CSI filtering to control the interference variation. This is similar to the CRS-based modes, where CSI filtering increases the performance by reducing the channel and interferer variations and helps control the SNR and CQI sent to the network.

In aspects, UE CSI filtering may be desirable for CSI-RS and CSI-IM based modes where tight TP coordination is absent or significant uncontrolled interference exists.

It can be seen that the effect of having or not having UE CSI filtering is not the same in all cases. There might be cases where filtering is not desirable and cases where it is desirable. This can depend on the coordination level as well as the network control on the interference.

For CSI-RS and CSI-IM based modes, UE CSI filtering can help in certain scenarios, and may not help in others. In aspects, for CSI-RS/CSI-IM based modes, the network may signal the filtering behavior to the UE based on the deployment and the network knowledge of the interference structure. This may help the UE in achieving the maximum performance in all conditions. In aspects, the network may send signaling information to the UE specifying the filtering behavior needed based on the deployment and the network knowledge of the interference structure.

Figure 11:
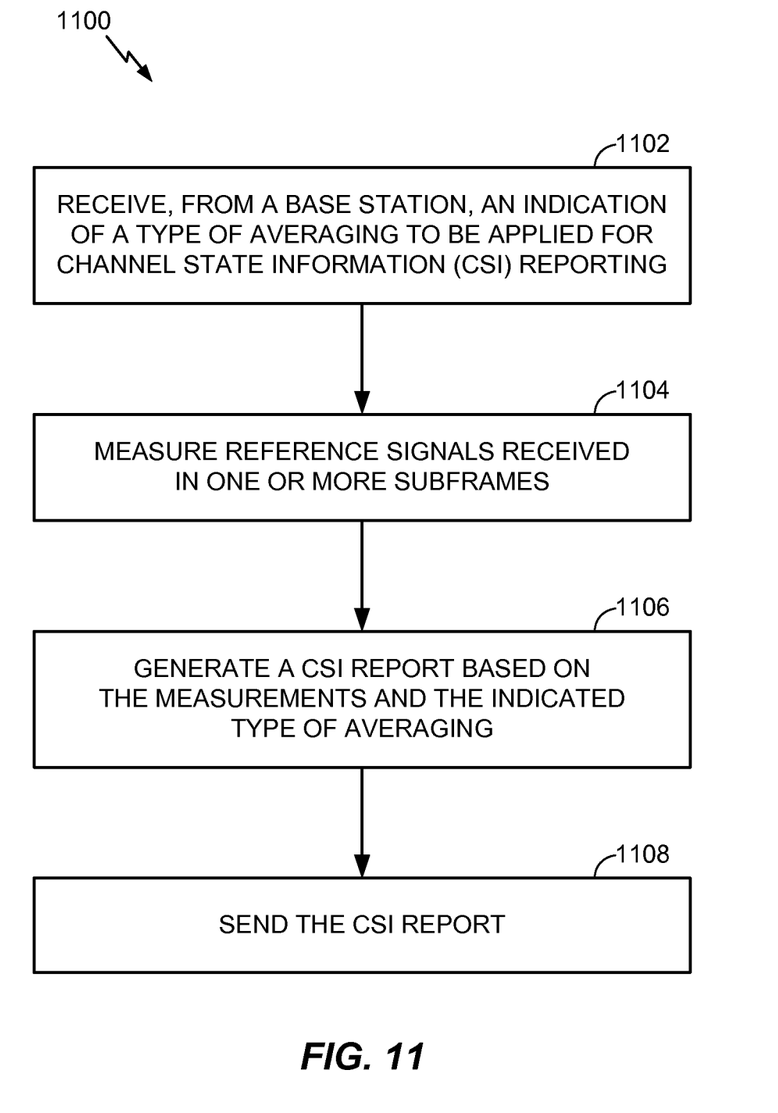
FIG. 11 illustrates example operations which may be performed by a UE, in accordance with certain aspects of the present disclosure.

FIG. 11 illustrates example operations 1100, in accordance with certain aspects of the present disclosure. The operations 1100 may be performed, for example, by a UE.

The operations 1100 may begin, at 1102, by receiving, from a base station, an indication of a type of averaging to be applied for channel state information (CSI) reporting.

At 1104, the UE may measure reference signals received in one or more subframes.

At 1106, the UE may generate a CSI report based on the measurements and the indicated type of averaging and may send the report, at 1008.

Figure 12:
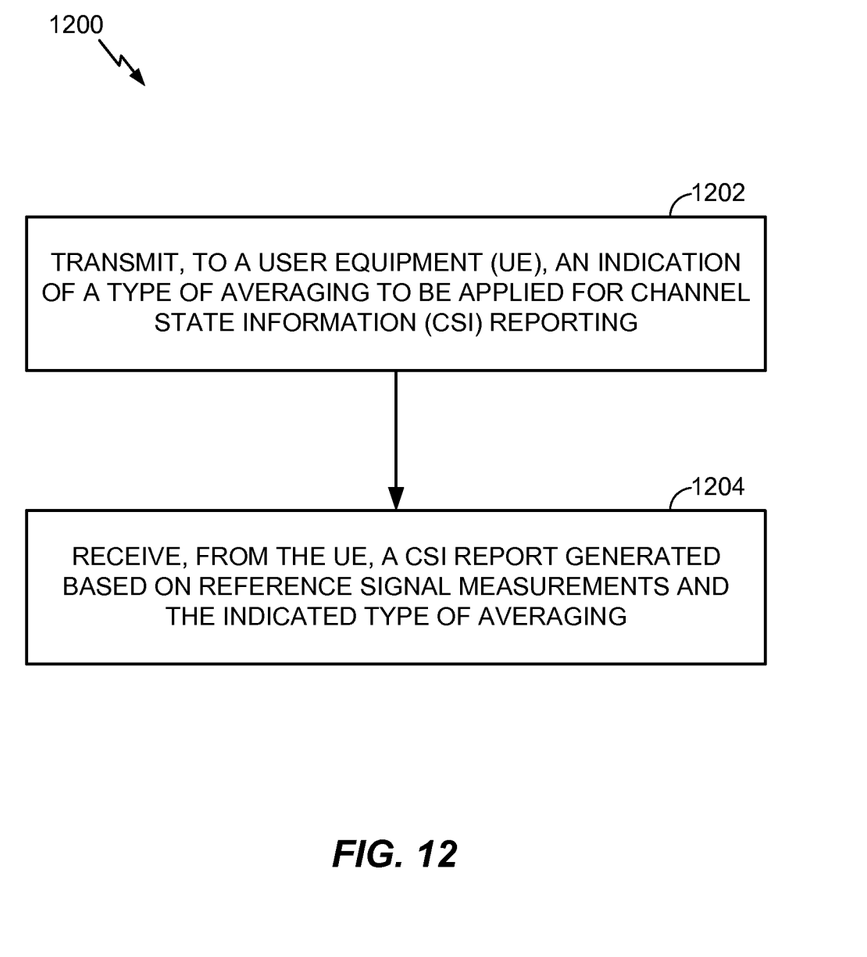
FIG. 12 illustrates example operations which may be performed by base station (BS), in accordance with certain aspects of the present disclosure.

FIG. 12 illustrates example operations 1200, in accordance with certain aspects of the present disclosure. The operations 1200 may be performed, for example, by a base station. The operations 1200 may begin, at 1202, by transmitting, to a user equipment (UE), an indication of a type of averaging to be applied for channel state information (CSI) reporting.

At 1204, the BS may receive, from the UE, a CSI report generated based on reference signal measurements and the indicated type of averaging.

As noted above, the indication of what type of averaging to use may indicate time domain averaging, frequency domain averaging, or no averaging. Further, the indication may indicate at least one of: interference averaging, channel averaging, signal to noise ratio (SNR) averaging, or spectral efficiency averaging.

The indication may be signaled in various ways. In some cases, the indication may be sent as part of a CSI reporting configuration. In some cases, separate indications may be provided independently for different interference measurement resources (IMRs). The indication may be provided via broadcast or dedicated signaling from the base station. Different indications may be provided for different CSI processes for a same interference measurement resource (IMR).

Further, different indications may be provided for different types of averaging to be applied independently to different subsets of subframes. For example, subframes in a subset may be selected based, at least in part, on traffic load of a corresponding interfering base station.

As described above, the indication may be provided as a single bit indicating one of two averaging modes. The two averaging modes may include a fixed averaging mode wherein averaging is applied across a limited range of resources and a less restricted averaging mode wherein averaging is applied across a wider range of resources.

In some cases, the indication may associate a reporting process with a certain set of measurement resources. For example, the indication may associate a periodic CSI measurement process with a measurement subframe subset.

The various operations of methods described above may be performed by any suitable means capable of performing the corresponding functions. The means may include various hardware and/or software/firmware component(s) and/or module(s), including, but not limited to a circuit, an application specific integrated circuit (ASIC), or processor. Generally, where there are operations illustrated in the Figures, those operations may be performed by any suitable corresponding counterpart means-plus-function components.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

Those of skill would further appreciate that the various illustrative logical blocks, modules, circuits, and algorithm steps described in connection with the disclosure herein may be implemented as electronic hardware, software/firmware, or combinations thereof. To clearly illustrate this interchangeability of hardware and software, various illustrative components, blocks, modules, circuits, and steps have been described above generally in terms of their functionality. Whether such functionality is implemented as hardware or software/firmware depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software/firmware module executed by a processor, or in a combination thereof A software/firmware module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal.

In one or more exemplary designs, the functions described may be implemented in hardware, software/firmware, or combinations thereof. If implemented in software, the functions may be stored on or transmitted over as one or more instructions or code on a computer-readable medium. Computer-readable media include both computer storage media and communication media including any medium that facilitates transfer of a computer program from one place to another. A storage medium may be any available medium that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

As used herein, a phrase referring to "at least one of" a list of items refers to any combination of those items, including single members. As an example, "at least one of a, b, or c" is intended to cover a, b, c, a-b, a-c, b-c, and a-b-c.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications by a user equipment (UE), comprising:
    receiving, from a base station (BS), an indication of whether averaging should be applied for channel state information (CSI) reporting, wherein the indication comprises:
        an indication that averaging should not be applied for the CSI reporting when the BS is aware of traffic patterns of neighboring BSs, and
        an indication that averaging should be applied for the CSI reporting when the BS is not aware of the traffic patterns of neighboring BSs;
    measuring reference signals received in one or more subframes;
    generating a CSI report based on the measurements and the indication of whether averaging should be applied; and
    sending the CSI report.

2. The method of claim 1, wherein the indication that averaging should be applied comprises an indication at least one of: time domain averaging or frequency domain averaging should be applied.

3. The method of claim 1, wherein the indication that averaging should be applied comprises an indication of at least one of: interference averaging, channel averaging, signal to noise ratio (SNR) averaging, or spectral efficiency averaging should be applied.

4. The method of claim 1, wherein the indication is received as part of a CSI reporting configuration.

5. The method of claim 1, wherein the indication is provided independently for different interference measurement resources (IMRs).

6. The method of claim 1, wherein the indication is provided via at least one of: broadcast or dedicated signaling from the base station.

7. The method of claim 1, wherein different indications are provided for different CSI processes for a same interference measurement resource (IMR).

8. The method of claim 1, wherein different indications are provided for different types of averaging to be applied independently to different subsets of subframes.

9. The method of claim 8, wherein subframes in a subset are selected based, at least in part, on traffic load of a corresponding interfering BS.

10. The method of claim 1, wherein the indication that averaging should be applied is provided as a single bit indicating one of two averaging modes.

11. The method of claim 10, wherein the two averaging modes comprise:
    a first averaging mode wherein averaging is applied across a first range of resources; and
    a second averaging mode wherein averaging is applied across a second range of resources different than the first range of resources.

12. The method of claim 1, further comprising:
    receiving, from the BS, signaling to associate a reporting process with a certain set of measurement resources.

13. The method of claim 12, wherein the signaling associates a periodic CSI measurement process with a measurement subframe subset.

14. A method for wireless communications by a base station (BS), comprising:
    transmitting, to a user equipment (UE), an indication of whether averaging should be applied for channel state information (CSI) reporting, wherein the indication comprises:
        an indication that averaging should not be applied for the CSI reporting when the BS is aware of traffic patterns of neighboring BSs, and
        an indication that averaging should be applied for the CSI reporting when the BS is not aware of the traffic patterns of neighboring BSs; and
    receiving, from the UE, a CSI report generated based on reference signal measurements and the indication of whether averaging should be applied.

15. The method of claim 14, wherein the indication that averaging should be applied comprises an indication at least one of: time domain averaging or frequency domain averaging should be applied.

16. The method of claim 14, wherein the indication that averaging should be applied comprises an indication of at least one of: interference averaging, channel averaging, signal to noise ratio (SNR) averaging, or spectral efficiency averaging should be applied.

17. The method of claim 14, wherein the indication is transmitted as part of a CSI reporting configuration.

18. The method of claim 14, wherein the indication is provided independently for different interference measurement resources (IMRs).

19. The method of claim 14, wherein the indication is provided via at least one of: broadcast or dedicated signaling from the base station.

20. The method of claim 14, wherein different indications are provided for different CSI processes for a same interference measurement resource (IMR).

21. The method of claim 14, wherein different indications are provided for different types of averaging to be applied independently to different subsets of subframes.

22. The method of claim 21, wherein subframes in a subset are selected based, at least in part, on traffic load of a corresponding interfering BS.

23. The method of claim 14, wherein the indication that averaging should be applied is provided as a single bit indicating one of two averaging modes.

24. The method of claim 23, wherein the two averaging modes comprise:
    a first averaging mode wherein averaging is applied across a first range of resources; and
    a second averaging mode wherein averaging is applied across a second range of resources different than the first range of resources.

25. The method of claim 14, further comprising:
    transmitting, to the UE, signaling to associate a reporting process with a certain set of measurement resources.

26. The method of claim 25, wherein the signaling associates a periodic CSI measurement process with a measurement subframe subset.

27. An apparatus for wireless communications by a user equipment (UE), comprising:
    means for receiving, from a base station (BS), an indication of whether averaging should be applied for channel state information (CSI) reporting, wherein the indication comprises:
        an indication that averaging should not be applied for the CSI reporting when the BS is aware of traffic patterns of neighboring BSs, and
        an indication that averaging should be applied for the CSI reporting when the BS is not aware of the traffic patterns of neighboring BSs;
    means for measuring reference signals received in one or more subframes;
    means for generating a CSI report based on the measurements and the indication of whether averaging should be applied; and
    means for sending the CSI report.

28. An apparatus for wireless communications by a base station (BS), comprising:
    means for transmitting, to a user equipment (UE), an indication of whether averaging should be applied for channel state information (CSI) reporting, wherein the indication comprises:
        an indication that averaging should not be applied for the CSI reporting when the BS is aware of traffic patterns of neighboring BSs, and
        an indication that averaging should be applied for the CSI reporting when the BS is not aware of the traffic patterns of neighboring BSs; and
    means for receiving, from the UE, a CSI report generated based on reference signal measurements and the indication of whether averaging should be applied.

* * * * *